United States Patent
Steckel

(10) Patent No.: US 6,874,760 B2
(45) Date of Patent: Apr. 5, 2005

(54) ANGLED-SLIT BITE-VALVE

(75) Inventor: Eric Samuel Steckel, Salt Lake City, UT (US)

(73) Assignee: Eric S. Steckel, Salt Lake City, UT (US)

(*) Notice: Subject to any disclaimer, the term of this patent is extended or adjusted under 35 U.S.C. 154(b) by 105 days.

(21) Appl. No.: 10/442,246

(22) Filed: May 21, 2003

(65) Prior Publication Data

US 2004/0232375 A1 Nov. 25, 2004

(51) Int. Cl.[7] ................................................. F15K 7/02
(52) U.S. Cl. ..................................... 251/342; 222/175
(58) Field of Search ............................... 251/341, 342; 222/175, 490, 529; 220/714; 224/148.2

(56) References Cited

U.S. PATENT DOCUMENTS

| 5,730,336 A | * | 3/1998 | Lerner | 222/490 |
| 5,791,510 A | * | 8/1998 | Paczonay | 220/714 |
| 6,062,435 A | * | 5/2000 | Hess, III | 222/175 |

* cited by examiner

Primary Examiner—F. Daniel Lopez
Assistant Examiner—John K. Fristoe Jr.

(57) ABSTRACT

Bite-valves are synonymous with personal hydration systems. Their action is to provide regulation of fluid that is drawn from the hydration reservoir by supplying a vacuum or by sucking like on a straw. Bite valves are placed in line and usually at the end of the line with the tube or hose that communicates with the reservoir. Bite-valves are normally closed and are opened when the person performs a biting action on the valve itself. Bite valves should provide the user with a perfect seal, high flow characteristics, and be small in size. Slit-type valves today are kinematically inefficient and as a consequence their flow rates are relatively slow compared to the inventor's bite-valve. This valve made of elastomeric material incorporates two angled slits along opposing vertical edges that are perpendicular to the biting direction or action. The general shape of the cross section at the site of the slitted septum is rectangular. The rectangular geometric shape is important in the flow dynamics of this valve. The septum, set back from the orifice's edge, is concavely biased towards the exit and is slit vertically at an angle such that the aperture is narrower on the exit side than on the fluid side and its purpose is to promote sealing at positive fluid pressures. When the bite-valve is pinched as from a biting action the concavely biased septum folds on itself while the side walls bulge away from each other, and form two fluid paths of a semi-circular cross section, one on each side. In addition to the formation of two fluid paths they are smooth in transition from the tubular central path and allow for flow rates almost twice that of bite-valves with a single slit of similar size.

17 Claims, 4 Drawing Sheets

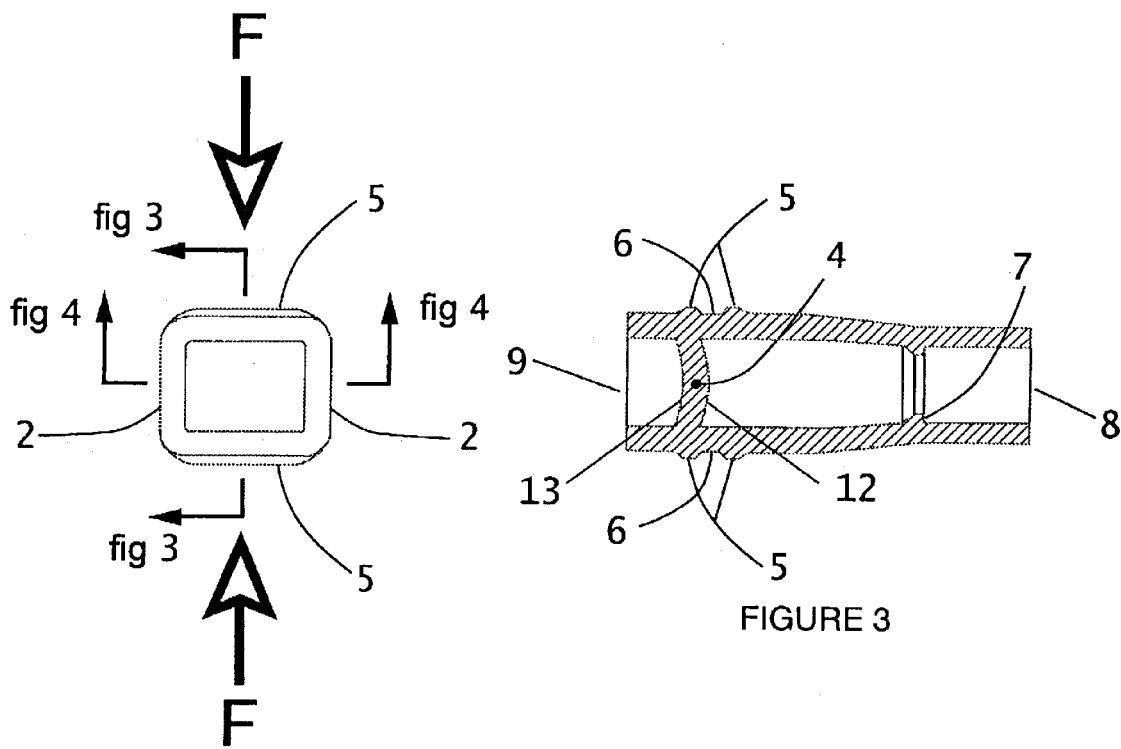
FIGURE 2
FIGURE 3
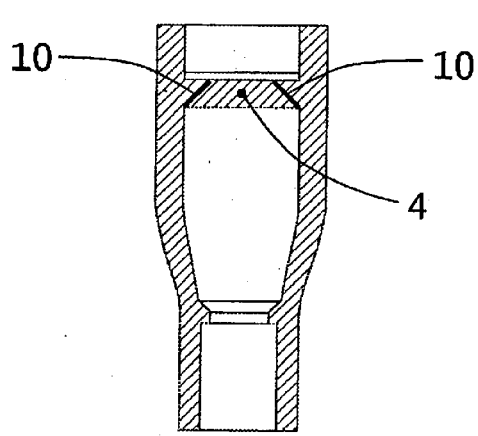
FIGURE 4

ANGLED-SLIT BITE-VALVE

BACKGROUND AND RELATED ART

Bite-valves were developed in synchrony with reservoirs containing fluids to be drawn by action of sucking by the user. These systems have since become termed personal hydration systems. Bite valves are placed in line and usually at the end of the line with the tube or hose that communicates with the reservoir. The function of a bite-valve is to provide fluid regulation by action of biting. Bite-valves are normally closed and are opened when the person performs a biting action on the valve itself. In recent years bite valves have been developed using many different methods. Vent simple bite valves have been designed comprising a single straight-slit centered on the face of a piece of elastomeric material, and when the valve is compressed by action of biting, the slit opens such that an elliptical orifice is rendered through which the fluid flows. These valves can have problems with sealing, even under minimal or no positive pressure. Flow rates associated with these valves can be good to mediocre according to today's standards. Other valves utilize several components to achieve the desired reactions. Valves of this type in the marketplace today usually provide better sealing, and flow rates equal or less than single-slit valves. Configurations of bite-valves with more than one slit have been developed but have not maximized the use of geometry to optimize both the flow rate and sealing capabilities as disclosed in U.S. Pat. No. 5,601,207, issued Feb. 11, 1997. In the same patent, most similar of the figures is FIG. 4A that shows a concave face and two slits. This is where the similarity ends and the improvements shown in my invention begin.

BRIEF DESCRIPTION OF INVENTION

A new bite valve which incorporates two angularly opposed slits has been developed that provides a fluid tight seal at low to moderate pressures. It is also capable of delivering flow rates at least nearly two times the rate of single-slit valves of similar size and at a rate nearly equal to a tube dispensing fluid having no valve or impedance at all. The valve is molded as a single elastomeric element and is slit in a second operation allowing it to be produced at low cost.

This valve incorporates two angularly opposed slits along opposing vertical edges that are parallel to the biting direction or action. The general shape of the cross section at the site of the slit septum is rectangular. This geometric shape is important in the flow dynamics of this valve. The septum, set back from the orifice's edge, is concavely biased towards the exit and is slit vertically on an angle such that the aperture is narrower on the exit side than on the fluid side. The angle cut is oriented as described to facilitate sealing when under positive pressure. The sealing is effectively increased when used in conjunction with the aforementioned biased septum. Under positive pressure the bias tends to lessen such that a force is imparted into the valve tending to stretch the vertical walls of the rectangular cross section resulting in a compressive force between the adjacent surfaces of the angularly opposed slits resulting in a tighter seal. Angled slits also increase the sealing capability by increasing the sealing area of the opposed surfaces. When the bite-valve is pinched as from a biting action the concavely biased septum folds on itself while the vertical side walls bulge away from each other, and form two fluid paths of a semi-circular cross section, one on each side. Using vertical side walls maximize the fluid paths' area when pinched. In addition to the formation of two fluid paths they are smooth in transition from the tubular central path and allow for flow rates almost twice that of bite-valves with a single slit.

It should also be evident to the reader that designs comprising multiple septum faces could have any number of angled slits on any face and that the septum's faces can form a chevron with the apex disposed in either direction.

BRIEF DESCRIPTION OF DRAWINGS

FIG. 2 is a front view of the valve facing the fluid exit in the closed state.

FIG. 3 is a cross-sectional view of FIG. 2 labeled FIG. 3 in the closed state.

FIG. 4 is a cross-sectional view of FIG. 2 labeled FIG. 4 in the closed state.

DESCRIPTION OF ILLUSTRATED EMBODIMENT

Figure 1A:
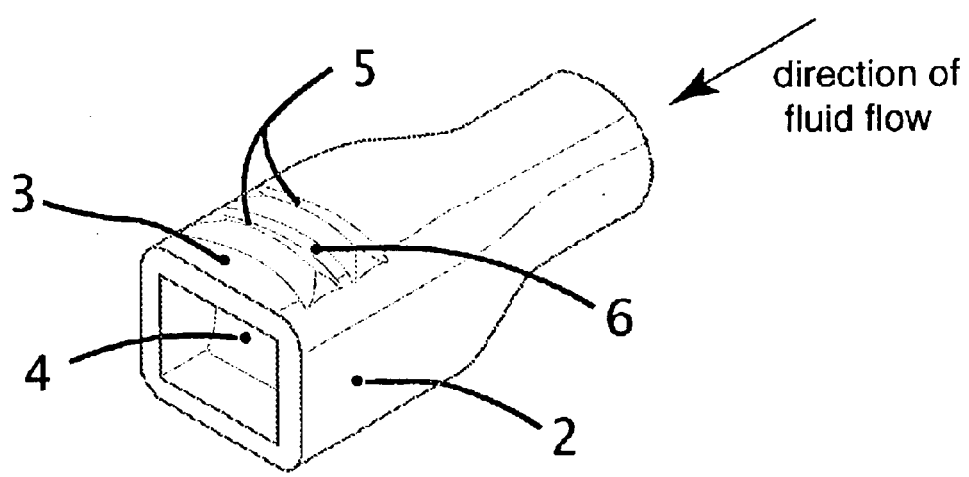
FIG. 1a and FIG. 1b are isometric depictions of the valve.
Figure 1B:
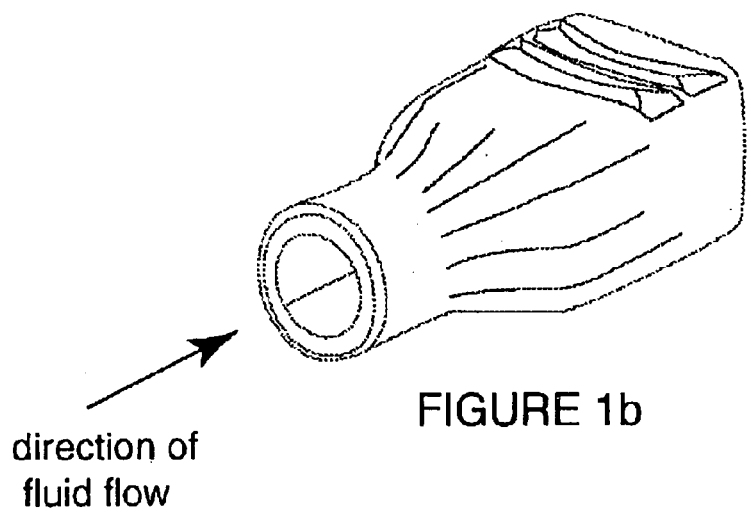
Figure 5:
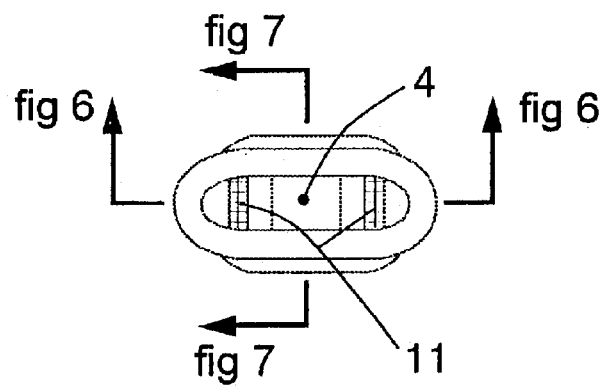
FIG. 5 is a front view of the valve facing the fluid exit in the open state.
Figure 7:
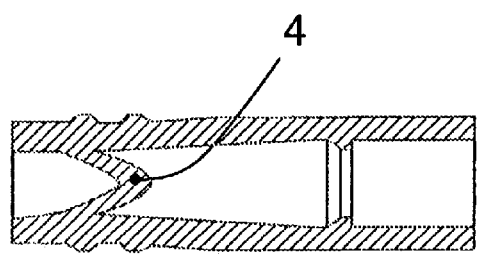
FIG. 7 is a cross-sectional view of FIG. 5 labeled FIG. 7 in the open state.
Figure 6:
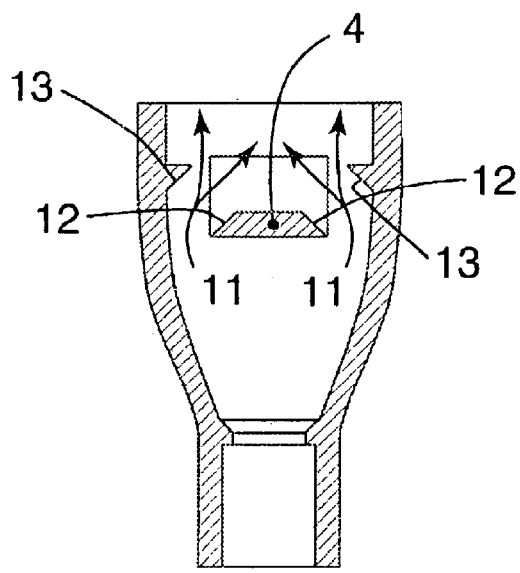
FIG. 6 is a cross-sectional view of FIG. 5 labeled FIG. 6 in the open state.
Figure 8:
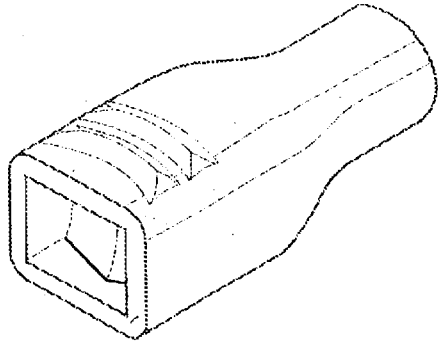
FIG. 8 is an isometric depiction of the valve displaying multiple septum faces with the apex of the chevron disposed towards the fluid exit.
Figure 9:
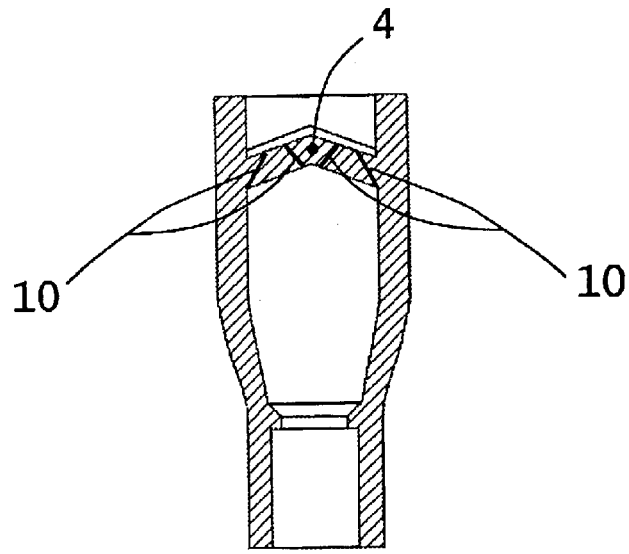
FIG. 9 is a cross-sectional view of FIG. 8 taken in the same plane as FIG. 3 of isometric FIG. 2 in the closed state.
Figure 10:
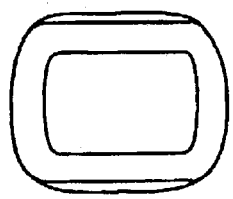
FIG. 10 is a front view similar in perspective to FIG. 2 displaying an alternate and curvilinear profile of two opposing walls.
Figure 11:
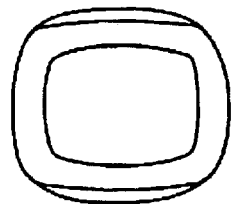
FIG. 11 is a front view similar in perspective to FIG. 2 displaying another alternate curvilinear profile of all opposing walls.

FIG. 1 is an isometric view of Bite Valve 1 depicting features Vertical Wall 2, Horizontal Wall 3, Septum 4, Bite Ridges 5, and Bite Groove 6. Applying a force in the direction of the arrows in FIG. 2 results in the formation of Fluid Paths 11 when the Vertical Walls 2 bulge outwardly away from each other while Septum 4 folds on itself (reference FIG. 5, FIG. 6, FIG. 7). Septum 4 is curved in its cross section with the concavity facing towards the Fluid Exit 9 and is slit through at an angle from the external Dry Surface 13 towards internal Wet Surface 12 such that the Septum 4 on the dry/Fluid Exit 9 side is more narrow than the opposite Fluid Entry 8 side. The mechanics of the Angled Slit 10 and the curved profile of Septum 4 compliment each other such that a better seal is formed under positive pressure than when there is no pressure. Fluid pressure acting on the Wet Surface 12 imparts a separating force against the Horizontal Walls 3 that results in a compressive force in the Septum 4 due to the stretching of. Vertical Walls 2. The interaction of both the tensile and compressive forces in Vertical Walls 2 and Septum 4 respectively results in the Sealing Surface 12 of Vertical Wall 2 and the Sealing Surface 13 of Septum 4 acting against each other such that the surfaces are squeezed together to form a better seal. Tube Stop 7 acts to prevent the fluid supply tube from interfering with Septum 4 valve actuation by providing a positive stop during assembly. Bite Ridges 5 spaced apart to form Bite Groove 6 for user to accurately apply biting force (labeled "F" in FIG. 2) in order to optimize valve performance.

I claim:

1. Device for controlling the flow of a liquid by applying an opposed external force to actuate the said device comprising in combination:
   a hollow body portion defining an interior for accommodating fluid received from a liquid source, said body portion including a fluid inlet end communicating with said interior for receiving liquid from the liquid source and a fluid outlet end spaced from said fluid inlet end; and
   a deformable closure connected to said body portion and extending across the fluid outlet end of said body portion, said closure including an outer closure surface and an inner closure surface spaced from said outer closure surface and having a plurality of slits formed therein at an angle opposing each other, said plurality of opposing angled slits being spaced from one another and extending between said outer closure surface and said inner closure surface, and at least one portion of said closure being located between and defined by said plurality of opposing angled slits and cooperating with the remainder of said closure to maintain said slits from said interior, said at least one portion changing shape upon application of said external forces on said device to open said plurality of slits and form a plurality of openings allowing said liquid flow from said interior.

2. The device according to claim 1 wherein said opposing angled slits located in said body portion extending across fluid outlet form an angle such that the extended lines parallel to said angled slits form a vertex on the fluid outlet side. Said slits are also mostly if not entirely parallel in direction to application of applied external forces when actuating said device.

3. The device according to claim 2 wherein said angled slits provide greater surface sealing area than a slit cut perpendicular to face of body portion extending across fluid outlet.

4. The device according to claim 1 wherein said opposing angled slits located in said body portion extending across fluid outlet are most outwardly disposed towards vertical walls of said body.

5. The device according to claim 1 wherein said body portion extending across fluid outlet has bias towards fluid inlet forming a concavity as viewed from external side of said device.

6. The device according to claim 5 wherein positive static fluid pressure on fluid inlet side provide means to close said angled slits more tightly.

7. The device according to claim 1 wherein said tubular body at said body portion extending across fluid outlet is preferably rectangular shaped, although it should be evident to the experienced person that a more curvilinear shape would function nearly the same.

8. The device according to claim 7 wherein positive static fluid pressure on fluid inlet side provide means to close said angled slits more tightly.

9. The device according to claim 7 wherein said body at region of said rectangular area has geometry to stiffen walls parallel to said angled slits to provide means of maintaining seal when said device is exposed to positive internal pressures on fluid inlet side. Said geometry may be feature based, such as ribs or may be an increased wall thickness of said tubular body at said region.

10. The device according to claim 7 wherein said body at region of said rectangular area is forcibly flexed during actuation or application of said external forces, said body portion extending across fluid outlet folds in on itself while portions not thereof bulge outward forming fluid paths between said body portion extending across fluid outlet and said body.

11. The device according to claim 1 wherein said body portion extending across fluid outlet is located preferably proximal to outlet end of said body.

12. The device according to claim 1 wherein said body has ridges forming grooves on sides of said body where external opposing forces are applied to actuate body.

13. The device according to claim 12 wherein said grooves are areas to direct application of said external forces.

14. The device according to claim 12 wherein said ridges maintain consistent gripping of body for application of said external actuating forces.

15. The device according to claim 1 wherein said tubular body has a smooth cross-sectional transition from the liquid supply end to the liquid outlet end.

16. Device for controlling the flow of a liquid by applying an opposed external force via action of biting between teeth of individual's mouth to actuate the said device comprising in combination:
   a hollow body portion defining an interior for accommodating fluid received from a liquid source, said body portion including a fluid inlet end communicating with said interior for receiving liquid from the liquid source and a fluid outlet end spaced from said fluid inlet end: and
   a deformable closure connected to said body portion and extending across the fluid outlet end of said body portion, said closure including an outer closure surface and an inner closure surface spaced from said outer closure surface and having a plurality of slits formed therein at an angle opposing each other, said plurality of opposing angled slits being spaced from one another and extending between said outer closure surface and said inner closure surface, and at least one portion of said closure being located between and defined by said plurality of opposing angled slits and cooperating with the remainder of said closure to maintain said slits from said interior, said at least one portion changing shape upon application of said external forces on said device to open said plurality of slits and form a plurality of openings allowing said liquid flow from said interior.

17. Device for controlling the flow of a liquid by applying an opposed external force via action of biting between teeth of individual's mouth to actuate the said device being of unitary construction, and formed of resilient, flexible material, said device comprising in combination:
   a hollow body portion defining an interior for accommodating fluid received from a liquid source, said body portion including a fluid inlet end communicating with said interior for receiving liquid from the liquid source and a fluid outlet end spaced from said fluid inlet end; and
   a definable closure connected to said body portion and extending across the fluid outlet end of said body portion, said closure including an outer closure surface and an inner closure surface spaced from said outer closure surface and having a plurality of slits formed therein at an angle opposing each other, said plurality of opposing angled slits being spaced from one another and extending between said outer closure surface and said inner closure surface, and at least one portion of said closure being located between and defined by said plurality of opposing angled slits and cooperating with the remainder of said closure to maintain said slits from said interior, said at least one portion changing shape upon application of said external forces on said device to open said plurality of slits and form a plurality of openings allowing said liquid flow from said interior.

* * * * *